United States Patent Office 2,904,031
Patented Sept. 15, 1959

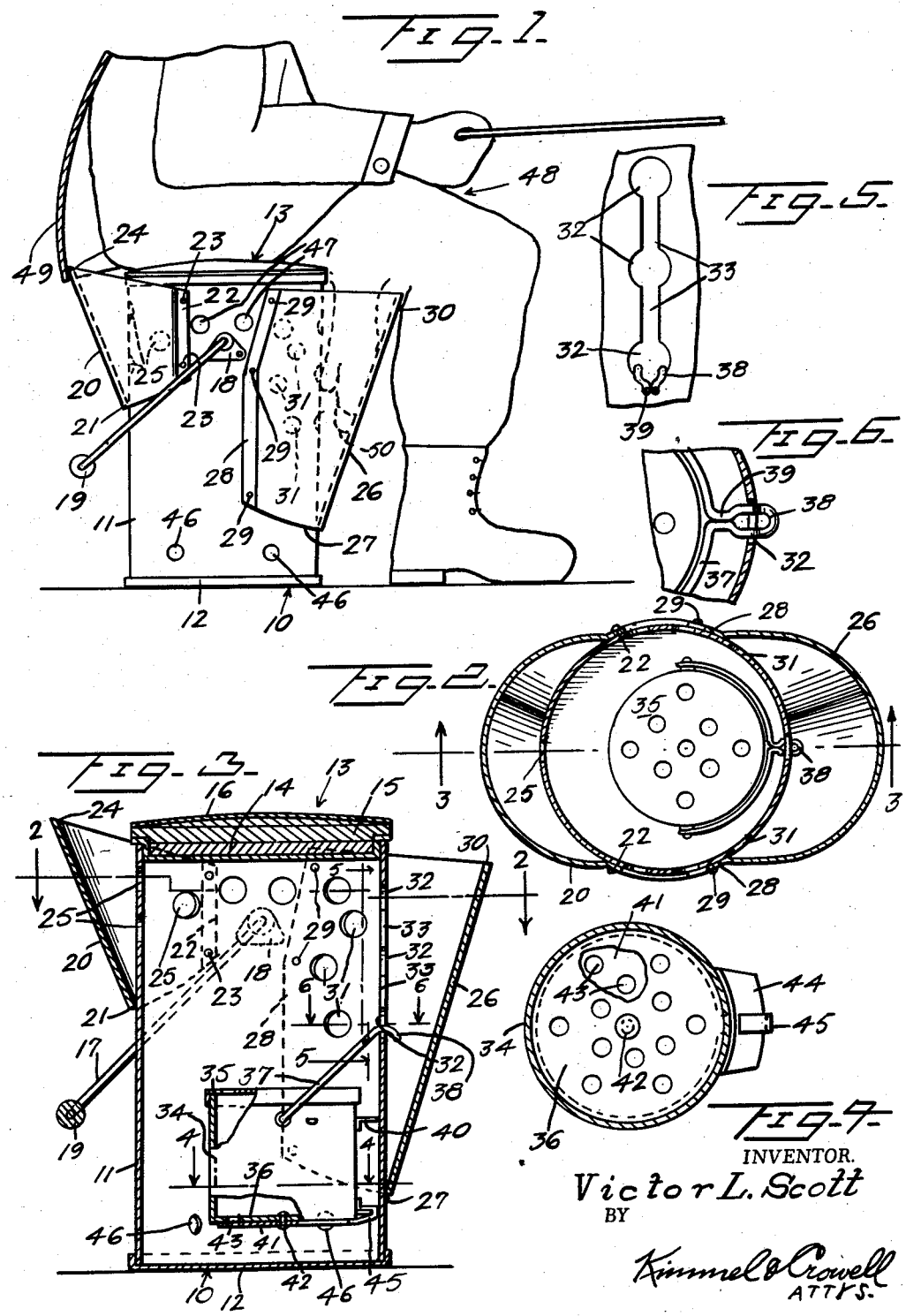

2,904,031
HOT SEAT

Victor L. Scott, Fenton, Mich.

Application January 10, 1958, Serial No. 708,317

5 Claims. (Cl. 126—204)

The present invention relates to hot seats, and particularly for heated seats used outdoors during winter sports activities.

The primary object of the invention is to provide a portable heated seat arranged for conducting heat under the coat and around the body of the user.

Another object of the invention is to provide a heated seat of the class described above in which means are provided for adjusting the heat output thereof.

A further object of the invention is to provide a heated seat of the class described above in which the heating element is formed removable and is usable as a portable stove for cooking and the like.

Another object of the invention is to provide a heated seat of the class described above which is inexpensive to manufacture, simple to use, and which is completely effective in warming the user even under extremely cold conditions.

Other objects and advantages will become apparent in the following specification when considered in the light of the attached drawings, in which:

Figure 1 is a side elevation of the invention shown in use by a fisherman.

Figure 2 is a horizonal cross-section taken along the line 2—2 of Figure 3, looking in the direction of the arrows, with the bail omitted.

Figure 3 is a vertical cross-section taken along the line 3—3 of Figure 2, looking in the direction of the arrows.

Figure 4 is a fragmentary horizontal cross-section taken along the line 4—4 of Figure 3, looking in the direction of the arrows, shown partly broken away for convenience of illustration.

Figure 5 is a fragmentary vertical cross-section taken along the line 5—5 of Figure 3, looking in the direction of the arrows.

Figure 6 is a fragmentary horizontal cross-section taken along the line 6—6 of Figure 3, looking in the direction of the arrows.

Referring now to the drawings in detail wherein like reference characters indicate like parts throughout the several figures, the reference numeral 10 indicates generally a heated seat constructed in accordance with the invention.

The heated seat 10 includes an upright cylindrical hollow body 11 having a base 12 fixed to its lower end. The body 11 has a circular seat 13 mounted on the upper end thereof and provided with an insulating layer 14 secured to the underside of a support disc 15 and a cushion layer 16 secured to the upper surface thereof.

A generally U-shaped bail 17 has its opposite ends secured to the body 11 by means of brackets 18. A handle 19 is positioned centrally on the bail 17, as can be seen in Figures 1 and 3. A hot air deflector 20 is arranged with its lower edge 21 in contact with the body 11 and with its opposite side edges 22 secured in vertical relation to the body 11 by means of rivets 23.

The hot air deflector 20 flares upwardly and outwardly from its lower edge 21 to its upper edge 24. The body 11 is provided with a plurality of hot air outlet openings 25 arranged to communicate the interior of the body 11 with a pocket defined by the deflector 20 to permit hot air from the body 11 to pass outwardly therefrom into the confines of the deflector 20.

A second hot air deflector 26 is positioned diametrically oppositely of the deflector 20 and has its lower edge 27 in engagement with the body 11. The deflector 26 has opposite side edges 28 secured to the body 11 by means of rivets 29. The deflector 26 flares upwardly and outwardly from its lower edge 27 to its upper edge 30 with the upper edge 30 at its central point being spaced outwardly from the body 11 a substantial distance.

The body 11 is provided with a plurality of apertures 31 communicating the interior of the body 11 with a pocket defined by the deflector 26 so that hot air rising in the body 11 may pass outwardly into the confines of the deflector 26. The body 11 centrally of the deflector 26 is provided with a plurality of vertically spaced vertically aligned circular openings 32 connected by vertically extending slots 33, as can be seen in Figure 5. The openings 32 and slots 33 have a function to be described below.

A cylindrical stove 34 having a diameter substantially less than the diameter of the body 11 is provided with a perforate lid 35 and a perforate bottom wall 36. A bail 37 has its opposite ends connected to the stove 34 and has the mid-portion thereof formed into a hook 38 having a narrow neck 39 connecting the hook 38 to the bail 37.

The stove 34 has a spacer bracket 40 secured to the side thereof to maintain the stove 34 in spaced relation to the body 11. The hook 38 of the bail 37 engages through any one of the circular openings 32 and is vertically adjustable therein by pulling the hook 38 through the circular openings 32 and sliding the narrow neck 39 vertically in the slots 33.

A grate 41 is journalled by pivot pin 42 centrally of the bottom wall 36. The grate 41 has a plurality of apertures 43 therein arranged to coincide with the perforations in the bottom wall 36 to provide draft through the stove 34. A bracket 44 extends laterally from the stove 34 adjacent the lower edge thereof and a handle 45 integrally formed on the grate 41 is reverted over the bracket 44 to provide means for regulating the draft.

The body 11 is provided with apertures 46 adjacent the lower end thereof to supply air to the stove 34. Additional apertures 47 are formed in the upper portion of the body 11 to permit the escape of hot air from the stove 34 around the sportsman, generally indicated at 48.

In the normal use of the invention, the stove 34 has burning charcoal therein and the sportsman 48 seats himself on the cushion 16 with his coattail 49 engaging over the upper edge 24 of the deflector 20. The legs of the sportsman 48 overlie the deflector 26 so that hot air rising from the stove 34 will pass upwardly around the sportsman 48 and under his coattail 49.

The seat 13, while insulated from burning contact with the heat from the stove 34, will permit the transfer of some heat through to the cushion 16 so as to warm the buttocks of the sportsman 48. Should the hands of the sportsman 48 become chilled they can be positioned within the deflector 26, as shown at 50, until warmed. In the event that extremely cold conditions prevail, the stove 34 can be raised within the body 11 so as to bring the source of heat closer to the sportsman 48.

When it is desired to use the stove 34 for cooking, the seat 13 is first removed and then the stove 34 is lifted out of the body 11, or if desired, under extremely windy conditions the stove 34 can be used within the body 11 for cooking purposes with the seat 13 removed.

Having thus described the preferred embodiment of the invention, it should be understood that numerous structural modifications and adaptations may be resorted to without departing from the scope of the appended claims.

What is claimed is:

1. A hot seat for sportsmen comprising a cylindrical hollow body, a pair of oppositely positioned upwardly and outwardly flaring hot air deflectors fixed to said body and defining therewith upwardly opening pockets, said body having apertures communicating the interior of said body with said pockets, a stove, means mounting said stove in said body for vertical adjustment therein, and a cushioned seat supported on the upper end of said body for supporting a user in overlying relation to said deflectors, said body having a plurality of air admitting apertures formed therein below said stove.

2. A device as claimed in claim 1 wherein said deflectors are formed of sheet metal with upper, lower and side edges with their side and lower edges in contact with said body and their upper edges flared outwardly a substantial distance intermediate said side edges.

3. A device as claimed in claim 1 wherein the means for adjustably mounting said stove in said body comprises a hook pivotally secured to said stove with said hook having a relatively narrow neck formed thereon, said body having a plurality of vertically aligned vertically spaced circular openings connected by a vertically extending slot whereby said hook may be engaged with said openings to support said stove and said hook may be moved vertically with said neck passing through said slot to adjust the height of said stove.

4. A device as claimed in claim 1 wherein said stove comprises a cylindrical housing having a perforated top and bottom and a bail on said stove for attaching said stove in a vertically adjusted position to the means mounting said stove in said body.

5. A device as claimed in claim 4 wherein means are provided in said stove for regulating the draft through the perforated bottom wall.

References Cited in the file of this patent

UNITED STATES PATENTS

| | | |
|---|---|---|
| 1,762,663 | McLeod | June 10, 1930 |
| 2,517,254 | Steele | Aug. 1, 1950 |
| 2,698,646 | Hepworth | Jan. 4, 1955 |
| 2,803,240 | Howell | Aug. 20, 1957 |
| 2,829,635 | Teller | Apr. 8, 1958 |

FOREIGN PATENTS

| | | |
|---|---|---|
| 7,201 | Great Britain | 1904 |
| 19,131 | Great Britain | 1911 |